(12) United States Patent
Bennett et al.

(10) Patent No.: US 7,970,889 B2
(45) Date of Patent: Jun. 28, 2011

(54) INTELLIGENT SUBSCRIPTION BUILDER

(75) Inventors: Valerie M. Bennett, Macon, NC (US);
George L. Fridrich, Cary, NC (US);
Mohit Jain, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1443 days.

(21) Appl. No.: 10/733,625

(22) Filed: Dec. 11, 2003

(65) Prior Publication Data
US 2005/0132067 A1    Jun. 16, 2005

(51) Int. Cl.
G06F 15/16    (2006.01)
G06F 15/173    (2006.01)

(52) U.S. Cl. ......................................... 709/224; 709/206

(58) Field of Classification Search .......................... None
See application file for complete search history.

(56) References Cited

U.S. PATENT DOCUMENTS

| | | | |
|---|---|---|---|
| 5,694,546 A | 12/1997 | Reisman | |
| 5,844,554 A | 12/1998 | Geller et al. | |
| 5,948,061 A * | 9/1999 | Merriman et al. | 709/219 |
| 6,055,512 A | 4/2000 | Dean et al. | |
| 6,094,681 A * | 7/2000 | Shaffer et al. | 709/224 |
| 6,098,065 A * | 8/2000 | Skillen et al. | 707/3 |
| 6,163,274 A * | 12/2000 | Lindgren | 340/7.29 |
| 6,195,653 B1 | 2/2001 | Bleizeffer et al. | |
| 6,208,975 B1 * | 3/2001 | Bull et al. | 705/14 |
| 6,366,915 B1 | 4/2002 | Rubert et al. | |
| 6,366,926 B1 | 4/2002 | Pohlmann et al. | |
| 6,377,963 B1 | 4/2002 | Walker et al. | |
| 6,405,034 B1 * | 6/2002 | Tijerino | 455/414.3 |
| 6,415,307 B2 * | 7/2002 | Jones et al. | 715/202 |
| 6,484,200 B1 | 11/2002 | Angal et al. | |
| 6,523,021 B1 | 2/2003 | Monberg et al. | |
| 6,591,245 B1 | 7/2003 | Klug | |
| 6,640,221 B1 | 10/2003 | Levine et al. | |
| 6,701,311 B2 | 3/2004 | Biebesheimer et al. | |
| 6,725,230 B2 | 4/2004 | Ruth et al. | |
| 6,731,393 B1 * | 5/2004 | Currans et al. | 358/1.12 |
| 6,751,611 B2 | 6/2004 | Krupin et al. | |
| 6,769,000 B1 * | 7/2004 | Akhtar et al. | 1/1 |
| 6,985,899 B2 | 1/2006 | Chan et al. | |
| 7,010,500 B2 * | 3/2006 | Aarnio | 705/26 |
| 7,020,494 B2 | 3/2006 | Spriestersbach et al. | |
| 7,069,254 B2 | 6/2006 | Foulger et al. | |
| 7,113,921 B2 * | 9/2006 | Linker et al. | 705/27 |

(Continued)

OTHER PUBLICATIONS

Simon, Jeff, et al. "WebSphere Everyplace Access Intelligent Notification Service Part 1: Setting up and Configuring Components", IBM Corporation (Nov. 20, 2003), printed Dec. 6, 2003 <http://www-106.ibm.com/developerworks/websphere/library/techarticles/0311_patterson/pattersonl.html> (p. 1-12).

(Continued)

Primary Examiner — David E England
(74) Attorney, Agent, or Firm — Marcia L. Doubet

(57) ABSTRACT

Techniques are disclosed for enabling end users to subscribe to information content, without requiring the end user to initiate the subscription process. User patterns are observed, and content subscriptions are offered to users based on these observations. Preferably, the user is allowed to customize the offered subscription, including conditions to be evaluated before content is considered as being of interest to this user, and/or one or more actions to be taken when the conditions are met.

14 Claims, 14 Drawing Sheets

U.S. PATENT DOCUMENTS

| | | | |
|---|---|---|---|
| 7,139,766 | B2 | 11/2006 | Thomson et al. |
| 7,162,470 | B2 | 1/2007 | Sharma et al. |
| 7,209,893 | B2 | 4/2007 | Nii |
| 7,249,100 | B2 | 7/2007 | Murto et al. |
| 7,370,040 | B1 | 5/2008 | Kruy et al. |
| 7,711,742 | B2 | 5/2010 | Bennett et al. |
| 2001/0043364 | A1 | 11/2001 | Messner et al. |
| 2002/0054134 | A1 | 5/2002 | Kelts |
| 2002/0065778 | A1 | 5/2002 | Bouet et al. |
| 2002/0078035 | A1 | 6/2002 | Frank et al. |
| 2002/0086637 | A1 | 7/2002 | Baese et al. |
| 2002/0087408 | A1 | 7/2002 | Burnett |
| 2002/0107842 | A1 | 8/2002 | Biebesheimer et al. |
| 2002/0107843 | A1 | 8/2002 | Biebesheimer et al. |
| 2002/0149614 | A1 | 10/2002 | Biebesheimer et al. |
| 2002/0166127 | A1* | 11/2002 | Hamano et al. ............... 725/105 |
| 2002/0173971 | A1 | 11/2002 | Stirpe et al. |
| 2002/0194379 | A1* | 12/2002 | Bennett et al. ................ 709/246 |
| 2003/0018634 | A1 | 1/2003 | Shringeri et al. |
| 2003/0069940 | A1 | 4/2003 | Kavacheri et al. |
| 2003/0172061 | A1 | 9/2003 | Krupin et al. |
| 2004/0019589 | A1 | 1/2004 | Basrur |
| 2004/0043758 | A1 | 3/2004 | Sorvari et al. |
| 2004/0181448 | A1* | 9/2004 | Hartsman et al. ............... 705/14 |
| 2004/0181457 | A1 | 9/2004 | Biebesheimer et al. |
| 2004/0205811 | A1* | 10/2004 | Grandy et al. ................... 725/28 |
| 2005/0004911 | A1 | 1/2005 | Goldberg et al. |
| 2005/0131778 | A1* | 6/2005 | Bennett et al. .................. 705/29 |
| 2005/0131889 | A1* | 6/2005 | Bennett et al. ..................... 707/4 |
| 2005/0132067 | A1* | 6/2005 | Bennett et al. ................ 709/228 |
| 2005/0198299 | A1* | 9/2005 | Beck et al. .................... 709/226 |
| 2007/0174453 | A1* | 7/2007 | Donoho et al. ............... 709/224 |

OTHER PUBLICATIONS

Simon, Jeff, et al. "WebSphere Everyplace Access Intelligent Notification Service Part 2: Subscribing and Using Applications", IBM Corporation (Nov. 20, 2003), printed Dec. 6, 2003 <http://www-106.ibm.com/developerworks/websphere/library/techarticles/0311_patterson/patterson2.html> (p. 1-10).

Simon, Jeff, et al. "WebSphere Everyplace Access Intelligent Notification Service Part 3: Using Server Initiated Actions", IBM Corporation (Nov. 20, 2003), printed Dec. 6, 2003 <http://www-106.ibm.com/developerworks/websphere/library/techarticles/0311_patterson/patterson3.html> (p. 1-12).

Pereira, Joao, et al. "Web Filter: A High-throughput XML-based Publish and Subscribe System", Proceedings of the 27th VLDB Conference, Roma, Italy (2001) (2 pages).

Jacobsen, Hans-Arno "The Push-Mi, Pull-Yu Event-Notification Kernel for Enhanced Publish/Subscribe", IEEE Distributed Systems Online, Middleware 2001, printed Jul. 23, 2003 <http://dsonline.computer.org/0107/features/jac0107.htm> (3 pages).

Going Wireless, Enabling an Adaptive and Extensible Environment. Feb. 2003. Mobile Networks and Applications. Publisher: Springer Netherlands.

Valerie M. Bennett, et al., U.S. Appl. No. 10/734,043, filed Dec. 11, 2003, Office Action, Jun. 27, 2006, 12 pages.

Valerie M. Bennett, et al., U.S. Appl. No. 10/734,043, filed Dec. 11, 2003, Office Action, Dec. 7, 2006, 16 pages.

Valerie M. Bennett, et al., U.S. Appl. No. 10/734,043, filed Dec. 11, 2003, Office Action, Mar. 8, 2007, 13 pages.

Valerie M. Bennett, et al., U.S. Appl. No. 10/734,043, filed Dec. 11, 2003, Office Action, Aug. 9, 2007, 14 pages.

Valerie M. Bennett, et al., U.S. Appl. No. 10/734,043, filed Dec. 11, 2003, Office Action, Mar. 4, 2008, 16 pages.

Valerie M. Bennett, et al., U.S. Appl. No. 10/734,043, filed Dec. 11, 2003, Office Action, Sep. 17, 2008, 9 pages.

Valerie M. Bennett, et al., U.S. Appl. No. 10/734,043, filed Dec. 11, 2003, Office Action, Dec. 4, 2008, 10 pages.

Valerie M. Bennett, et al., U.S. Appl. No. 10/734,043, filed Dec. 11, 2003, Office Action, Jun. 2, 2009, 11 pages.

Valerie M. Bennett, et al., U.S. Appl. No. 10/734,043, filed Dec. 11, 2003, Notice of Allowance, Dec. 18, 2009, 7 pages.

Valerie M. Bennett, et al., U.S. Appl. No. 10/733,985, filed Dec. 11, 2003, Office Action, Jan. 25, 2008, 10 pages.

Valerie M. Bennett, et al., U.S. Appl. No. 10/733,985, filed Dec. 11, 2003, Office Action, Jun. 23, 2008, 8 pages.

Valerie M. Bennett, et al., U.S. Appl. No. 10/733,985, filed Dec. 11, 2003, Advisory Action, Sep. 19, 2008, 3 pages.

Valerie M. Bennett, et al., U.S. Appl. No. 10/733,985, filed Dec. 11, 2003, Examiner' Answer, Apr. 28, 2009, 26 pages.

Valerie M. Bennett, et al., U.S. Appl. No. 10/733,985, filed Dec. 11, 2003, BPAI Decision, Jan. 26, 2010, 11 pages.

Valerie M. Bennett, et al., U.S. Appl. No. 10/733,985, filed: Dec. 11, 2003, Office Action, Feb. 4, 2011, 17 pages.

* cited by examiner

FIG. 3

```
300
<?xml version="1.0" encoding="UTF-8"?>
<!DOCTYPE config-data SYSTEM "clipping-config.dtd">
<config-data version='1.0'>
     <url>
310       <![CDATA[http://www.ibm.com/shopping.html]]>
     </url>
     <clipping type="HTML">
          <annotation>
               <![CDATA[<?xml version="1.0" encoding="UTF-8"?>
               <annot version="2.0">
                    <description take-effect="before" target="/HTML[1]/BODY[1]/*[1]">
330                      <remove/>
                    </description>
                    <description take-effect="before"
                    target="/HTML[1]/BODY[1]/descendant::text()[contains(., 'Results:')]/following::TABLE[1]">
340                      <keep/>
                    </description>
                    <description take-effect="after"
                    target="/HTML[1]/BODY[1]/descendant::text()[contains(., 'Results:')]/following::TABLE[1]">
350                      <remove/>
                    </description>
               </annot>
               ]]>
          </annotation>
     </clipping>
     <timeout>5</timeout>
     <url-rewriting></url-rewriting>
</config-data>
```

```xml
<XML>
<SubscribedContent>
<item>
<name_0> Mobile Computing Devices </name_0>
<name_1> Model 456 </name_1>
</item>
<item>
<name_0> Desktop Computing Devices </name_0>
<name_1> Model ABC </name_1>
</item>
<item>
<name_0> Peripherals </name_0>
<name_1> Monitors </name_1>
</item>
</SubscribedContent>
<SourceURL> http://www.ibm.com/shopping.html </SourceURL>
</XML>
```

FIG. 8

```xml
<xml>
<SourceURL> http://www.ibm.com/shopping.html</SourceURL>
<condition_1>
    <name> Mobile Computing Devices </name>
    <condition> Like </condition>
    <value> Model 456 </value>
</condition_1>
<condition_2>
    <name> Desktop Computing Devices </name>
    <condition> Like </condition>
    <value> Model ABC </value>
</condition_2>
•
•
•
<action_1>
    <type> Send </type>
    <device> Mobile Phone</device>
    <When> Always </When>
</action_1>
•
•
•
</xml>
```

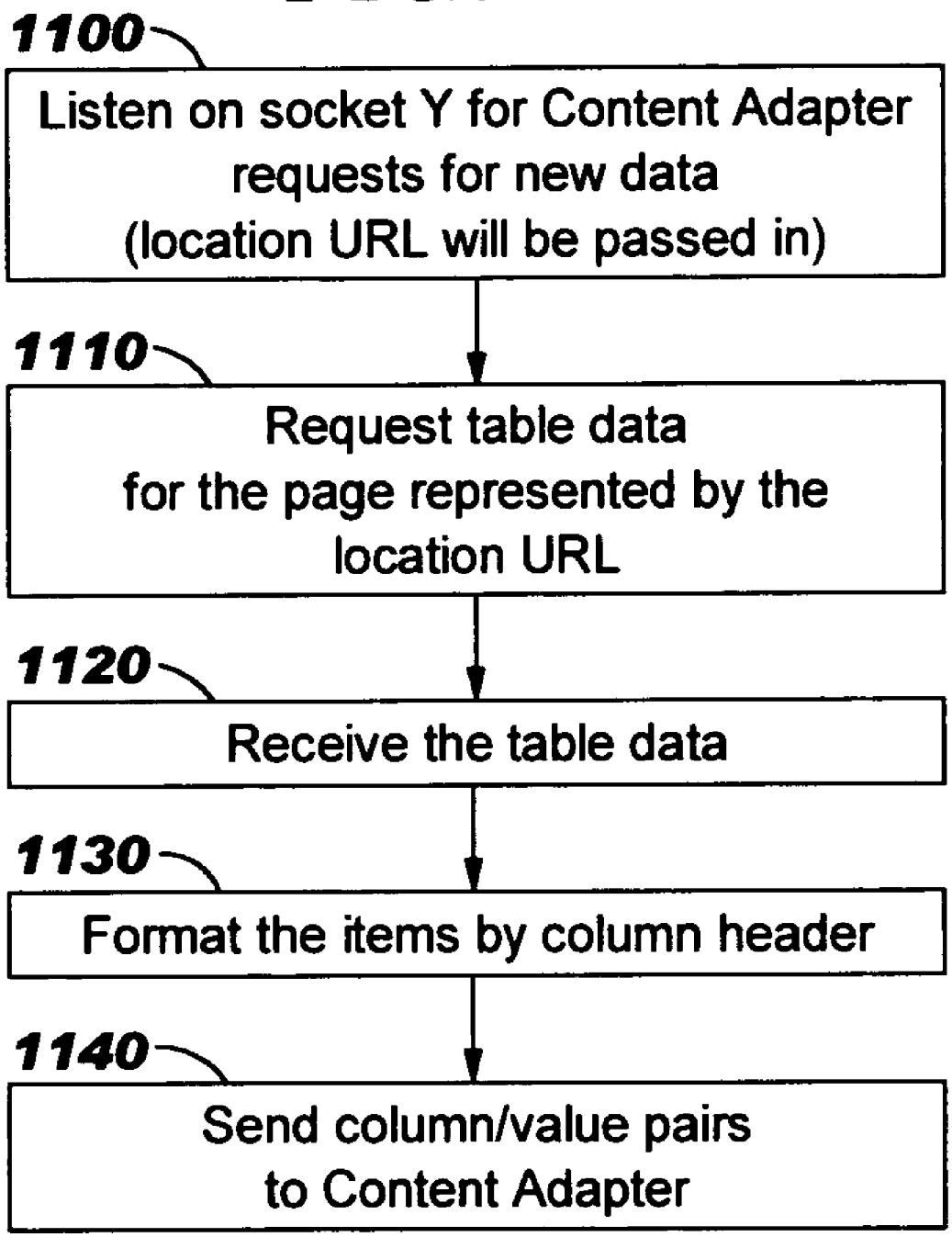

```
<?xml version="1.0" encoding="UTF-8"?>
<ContentRetrieval>
    <item>
        <Category>Mobile Computing Devices</category>
        <product>Model 123</product>
    </item>
    <item>
        <Category>Mobile Computing Devices</category>
        <product>Model 124</product>
    </item>
    <item>
        <Category>Mobile Computing Devices</category>
        <product>Model 456</product>
    </item>
    <item>
        <Category>Mobile Computing Devices</category>
        <product>Model 456 Express</product>
    </item>
    <item>
        <Category>Mobile Computing Devices</category>
        <product>Model 456 Enhanced</product>
    </item>
```

FIG. 12
(cont'd)

```
<item>
    <Category>Desktop Computing Devices</category>
    <product>Model ABC</product>
</item>
<item>
    <Category>Peripherals</category>
    <product>Cables</product>
</item>
<item>
    <Category>Peripherals</category>
    <product>Monitors</product>
</item>
</ContentRetrieval>
```

INTELLIGENT SUBSCRIPTION BUILDER

BACKGROUND OF THE INVENTION

1. Related Inventions

The present invention is related to the following commonly-assigned inventions, which were filed concurrently herewith: U.S. patent application Ser. No. 10/733,985, titled "Customized Subscription Builder" and U.S. patent application Ser. No. 10/734,043, titled "Intelligent Data Query Builder". These co-pending applications are hereby incorporated herein by reference.

2. Field of the Invention

The present invention relates to computer software, and deals more particularly with techniques for enabling end users to subscribe to information content, without requiring the end user to initiate the subscription process. User patterns are observed, and subscriptions are recommended based on these observations.

3. Description of the Related Art

In today's networked world, a user can be notified of events in a number of ways, including via their instant messaging client, e-mail client, or personal digital assistant ("PDA"). Unfortunately, however, users are limited to what they can be notified about because they are restricted to predetermined data feeds which are defined by other parties such as a software vendor or Web portal. Well-known examples of such data feeds include delivery of current weather, stock prices, and news to subscribers. Currently, the provider of the content is required to deploy a subscription interface that enables users to subscribe to content. Using the subscription interface, users indicate that they would like a particular data feed delivered to a client application over a communications network.

There are several drawbacks to existing techniques. If a content provider has not provided a subscription interface, then users are unable to subscribe to the content. Instead, they have to repeatedly take explicit action to continue viewing the content, such as returning to the content provider's Web page periodically. Another drawback of existing techniques is that, even if a subscription interface has been provided, it often does not have sufficient granularity to meet the needs or desires of end users. As a result, the user effectively gets no say as to what data feed is important to him/her. Furthermore, users may be unaware that they might benefit from a subscription to content. For example, novice users may not realize that a subscription-type function exists. As another example, users may not take time to notice that they repeatedly visit a particular content location to explicitly request updated content. Disadvantages are therefore realized not only by end users, but also by the content providers, who thereby fail to maximize exposure of their provided content (and as a result, may miss out on potential revenue).

The present invention provides novel techniques for enabling end users to subscribe to data feeds, without requiring the end user to initiate the subscription process.

SUMMARY OF THE INVENTION

An object of the present invention is to enable end users to subscribe to data feeds, without requiring the end user to initiate the subscription process.

Another object of the present invention is to provide techniques with which subscriptions to content can be easily provided for end users, while allowing the end users to have ultimate control over the conditions under which the content is delivered.

A further object of the present invention is to define techniques which allow content providers to selectively notify end users that the end users may benefit from receiving the provider's content.

Still another object of the present invention is to provide techniques with which content providers can locate end users who are candidates for subscribing to the provider's content, and provide those users with an easy-to-use subscription interface.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention may be provided as methods, systems, and computer program products. In one aspect of preferred embodiments, the present invention provides techniques for enabling end users to subscribe to content in a computing environment without requiring them to initiate a subscription process, comprising: identifying behavior patterns of a user; using the identified behavior patterns to identify content which may be of interest to the user; and offering, to the user, a subscription to the identified content, without requiring the user to initiate a request for the subscription. Preferably, the offered subscription is registered, upon acceptance thereof by the user, and the registered subscription is then used to deliver the identified content to the user. The user may be allowed to customize the offered subscription such that at least one condition is placed on at least one portion of the identified content (where the portion may comprise the identified content in its entirety), and in this case, the offered subscription, as customized by the user, is preferably registered upon acceptance thereof by the user. The registered subscription may be used to deliver the identified content to the user, and/or to carry out other action(s). If the user selected one or more conditions when customizing the subscription, then the content must match the condition(s). Behavior patterns may be identified for a plurality of users, and content may be identified that is interest to more than one user (and this content may vary among the users), such that subscriptions may be offered to more than one user.

The present invention will now be described with reference to the following drawings, in which like reference numbers denote the same element throughout.

BRIEF DESCRIPTION OF THE DRAWINGS

FIG. 3 illustrates a sample XPath file used when discussing operation of preferred embodiments;

FIGS. 5 and 11 provide flowcharts illustrating logic that may be used when implementing aspects of a CP2XML component used in preferred embodiments of the present invention;

FIG. 6 provides a markup language document representing sample input to the CP2XML component;

FIG. 8 provides a sample markup language document illustrating a result of customizing a user subscription;

FIG. 12 provides a sample markup language document illustrating refreshed content to be evaluated with reference to a subscribing user, according to preferred embodiments;

DESCRIPTION OF PREFERRED EMBODIMENTS

Figure 1:
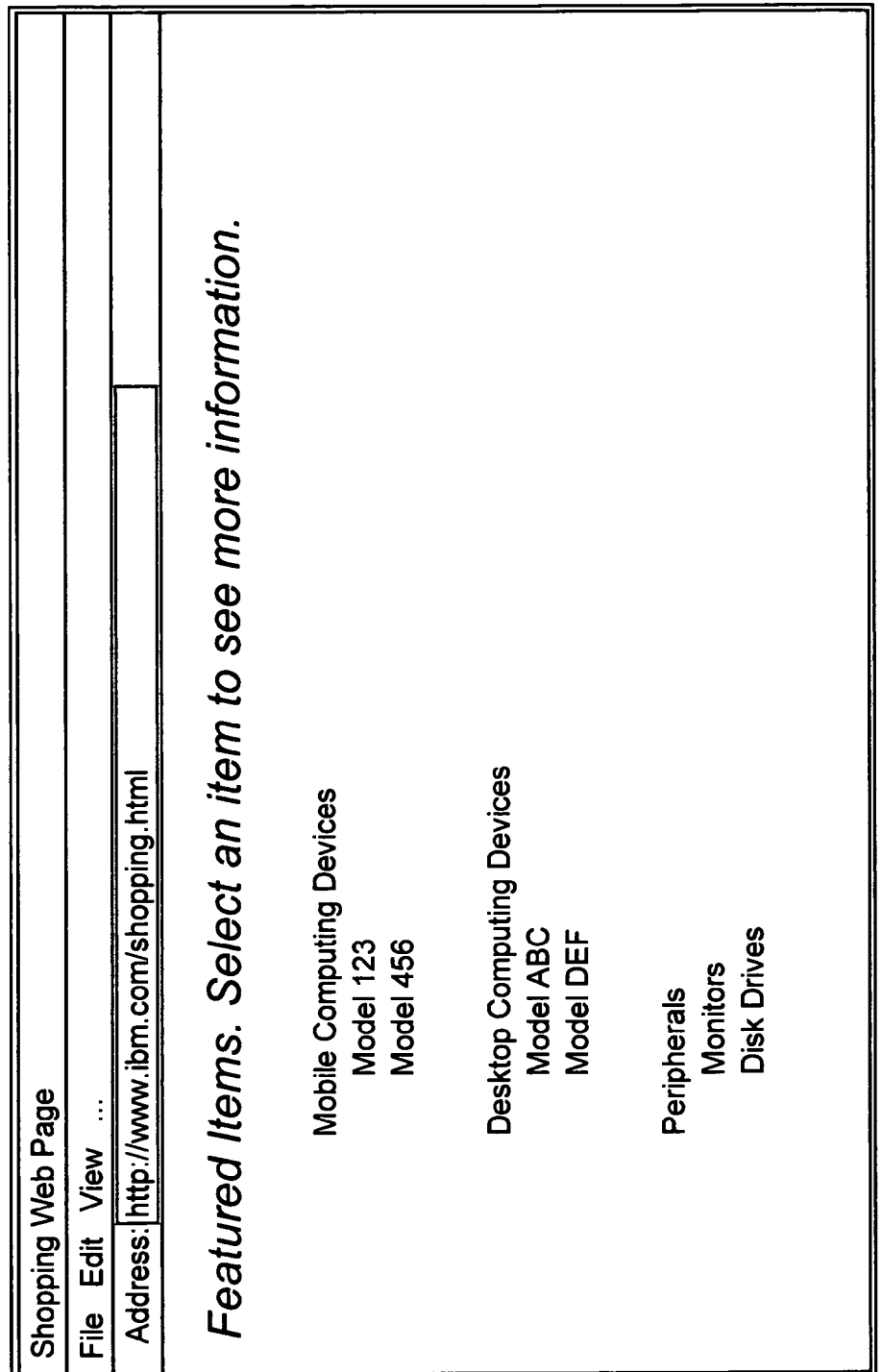
FIG. 1 provides a sample Web page illustrating content to which a user subscription may be offered, using techniques disclosed herein.

The present invention provides techniques that enable a content provider to use programmatically-discovered/observed behavior patterns of users, and then automatically query the users to determine whether they would like to subscribe to content which is offered by the provider and which is relevant to the behavior patterns. The disclosed techniques can be used effectively to allows users to subscribe to any data on the Internet (or other network; references herein to "Internet" or "Web" are by way of illustration but not of limitation). Users can therefore receive content aligned with their particular behavior patterns, without requiring the user to initiate the subscription process.

The users who are identified as candidate subscribers via the present invention may include those who interact with a provider's content, but do not subscribe on their own initiative. The failure to subscribe may, for example, be due to the user's failure to understand that a subscription interface is available. Or, it may be due to the user's failure to notice that he/she views the content repeatedly. The identified candidates may also include users who do not necessarily interact with the provider's content at present, but whose behavior indicates that the content might be of interest to the user.

Use of the present invention enables content providers, such as Web shopping sites, advertisers, and so forth, to locate potential viewers or customers and to pro-actively offer content subscriptions to them. End users also benefit from this "targeting" of potential subscribers by saving time, becoming informed of relevant content of which they might otherwise be unaware, and so forth. Hereinafter, these end users are referred to as "viewing" the subscribed content, although this is by way of illustration and not of limitation. For example, embodiments of the present invention may be used with content that is to be delivered in an audible form, rather than a viewable form, and such embodiments are within the scope of the present invention.

Suppose, for example, that a particular user drives his global positioning satellite ("GPS") enabled vehicle past a certain fast food outlet every day during the lunch hour. The fast food outlet may use an implementation of the present invention to detect this user's pattern, and may then offer him a subscription to the Web page where their menu and current special offerings are provided, or perhaps a subscription to a specialized Web page where discount coupons are offered as customer incentives.

As another example, a merchant that provides an online shopping service might use an implementation of the present invention to detect shopping habits of its customers. Suppose that a user purchases airline tickets to an international destination from an online travel service. The travel service might then automatically offer that user a subscription to content pertaining to hotels at the international destination and/or to other types of content such as local weather forecasts.

As yet another example, driving patterns of a user with a GPS-enabled vehicle might be observed, and an implementation of the present invention using this information might offer a subscription to a traffic-reporting Web page to this user. Many other examples may be envisaged, once the teachings disclosed herein are known.

The related U.S. patent application Ser. No. 10/733,985, titled "Customized Subscription Builder", referred to hereinafter as "the first related invention", discloses techniques whereby a user may subscribe to content even though the content provider has not deployed a subscription interface. Embodiments of the present invention may be used to offer subscriptions to users for content which does have an existing subscription interface, or for content which does not. In cases where a subscription interface does already exist, the interface disclosed in the first related invention is preferably used instead. Thus, references hereinafter are in terms of that interface.

As with the first related invention, another advantage offered to users by the present invention is that the users do not need to subscribe to fee-based subscription services in order to receive content in which they are interested. Another advantage offered to businesses by the present invention is that their content can now be readily available to users, preferably in a user-customizable manner where customizations can be selected by each individual user, thereby improving timeliness and value of the content as well as increasing end-user satisfaction.

Preferred embodiments will now be described in more detail with reference to FIGS. 1-15.

The sample Web page 100 depicted in FIG. 1 is used herein to illustrate how an end user's behavior patterns may be observed and used to offer that user a content subscription, according to the present invention. As shown therein, the sample Web page 100 corresponds to a Web site 110 on which featured computing devices and peripherals are offered for sale. In this example, the computing devices are presented in "Mobile Computing Devices" and "Desktop Computing Devices" categories, each of which is currently featuring two different models, and the featured peripherals include "Monitors" and "Disk Drives".

An implementation of the present invention may be adapted for behavior patterns that reflect various levels of detail. Suppose that a particular user John visits this Web site 110 regularly, perhaps trying to decide whether he would like to purchase a "Model 456" in the Mobile Computing Devices category or a "Model ABC" in the Desktop Computing Devices category. John may also peruse the monitors within the Peripherals category. In one approach, an implementation of the present invention may recognize simply that John is a repeat visitor to Web site 110, and may therefore offer him a subscription to the content of Web page 100. In another approach, an implementation of the present invention may offer John a selective content subscription, whereby John's subscription can be tailored to portions of the content such as those portions which he repeatedly uses or those portions which are deemed to be of interest based on his observed behaviors.

Figure 2:
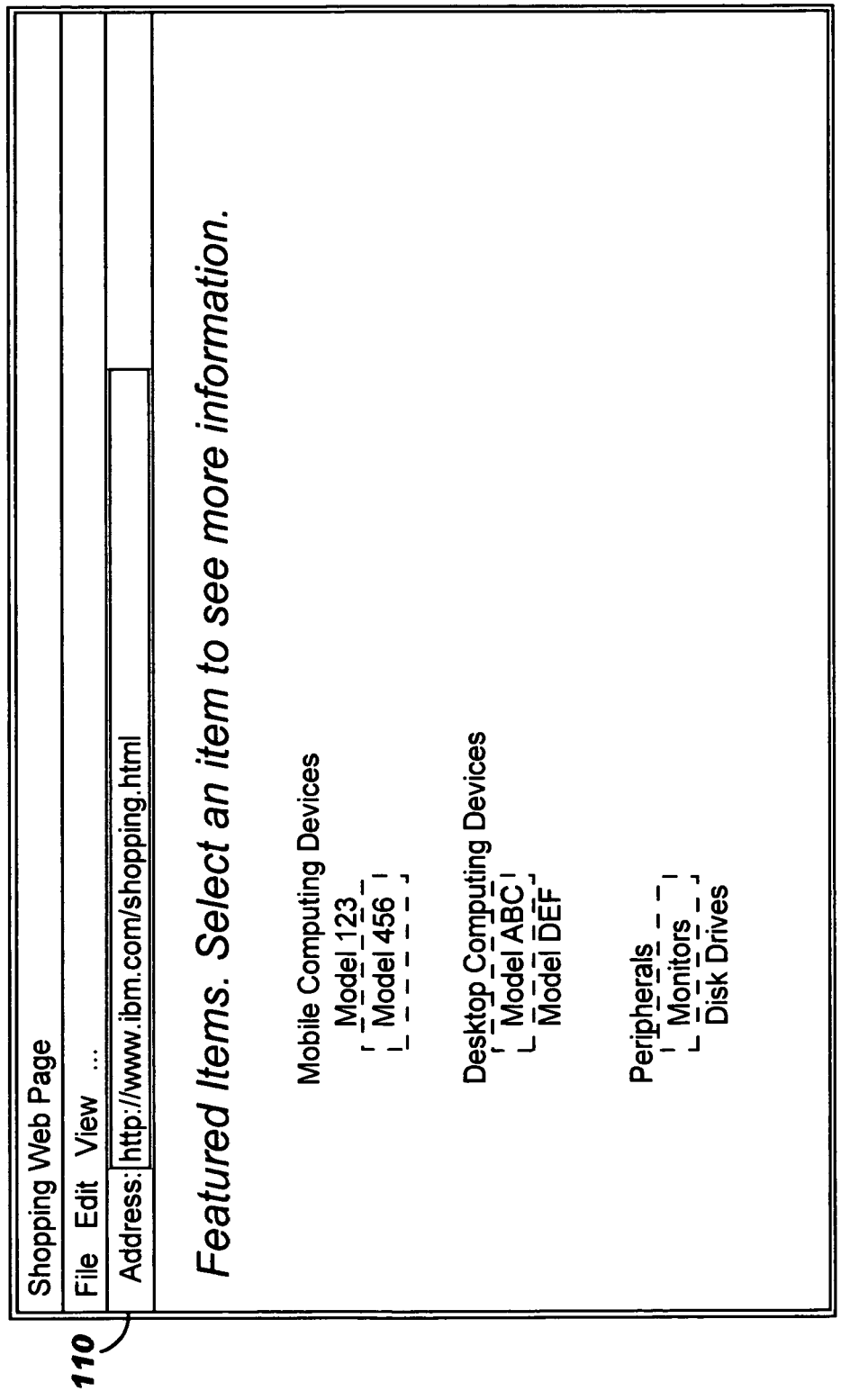
FIG. 2 illustrates the sample Web page from FIG. 1, showing which portions thereof a particular user interacts within on a recurring basis.

The latter approach is illustrated in FIG. 2. The content portions from the above example are highlighted therein, for reference, using dashed rectangles. When using this selective approach, John might choose to subscribe to only the highlighted content portions. Note that the result of using this selective approach is similar to scenarios which are enabled through use of the first related invention; however, end users themselves initiate the subscription process in that related invention. When using embodiments of the present invention, in contrast, a content provider typically initiates the search for candidate subscribers, based on user behaviors that are observed. Embodiments of the present invention may also be adapted for locating candidate subscriptions in response to an end user's request, if desired. For example, an end user may request that his/her behavior be tracked (such as, by way of example, viewing of Web content) over some time period, such that one or more candidate subscriptions can then be offered to the user based on the observed behavior.

Hereinafter, discussions of preferred embodiments presume that the user is not only presented with an offer to subscribe to content, but is also allowed to customize that subscription. The user-customizable subscriptions may allow a user to specify conditions under which he/she would like to receive an updated version of the content, for example, and/or one or more events that should be invoked when specified conditions are met (where these events may or may not include content delivery). Discussions hereinafter also presume that the user is allowed to selectively subscribe to content. That is, rather than providing the user with an option either to subscribe to all of the content located at a particular Uniform Resource Locator ("URL"), or not to subscribe to any of the content, preferred embodiments allow the user to subscribe to specified portions of the content. The user can thereby be notified of updates to the content, and can choose to receive only the data that is of interest to this user. For example, with reference to the scenario described above, John can be offered a subscription that includes a subset of the computing devices and a subset of the peripherals which are featured on Web page 100.

Figure 15:
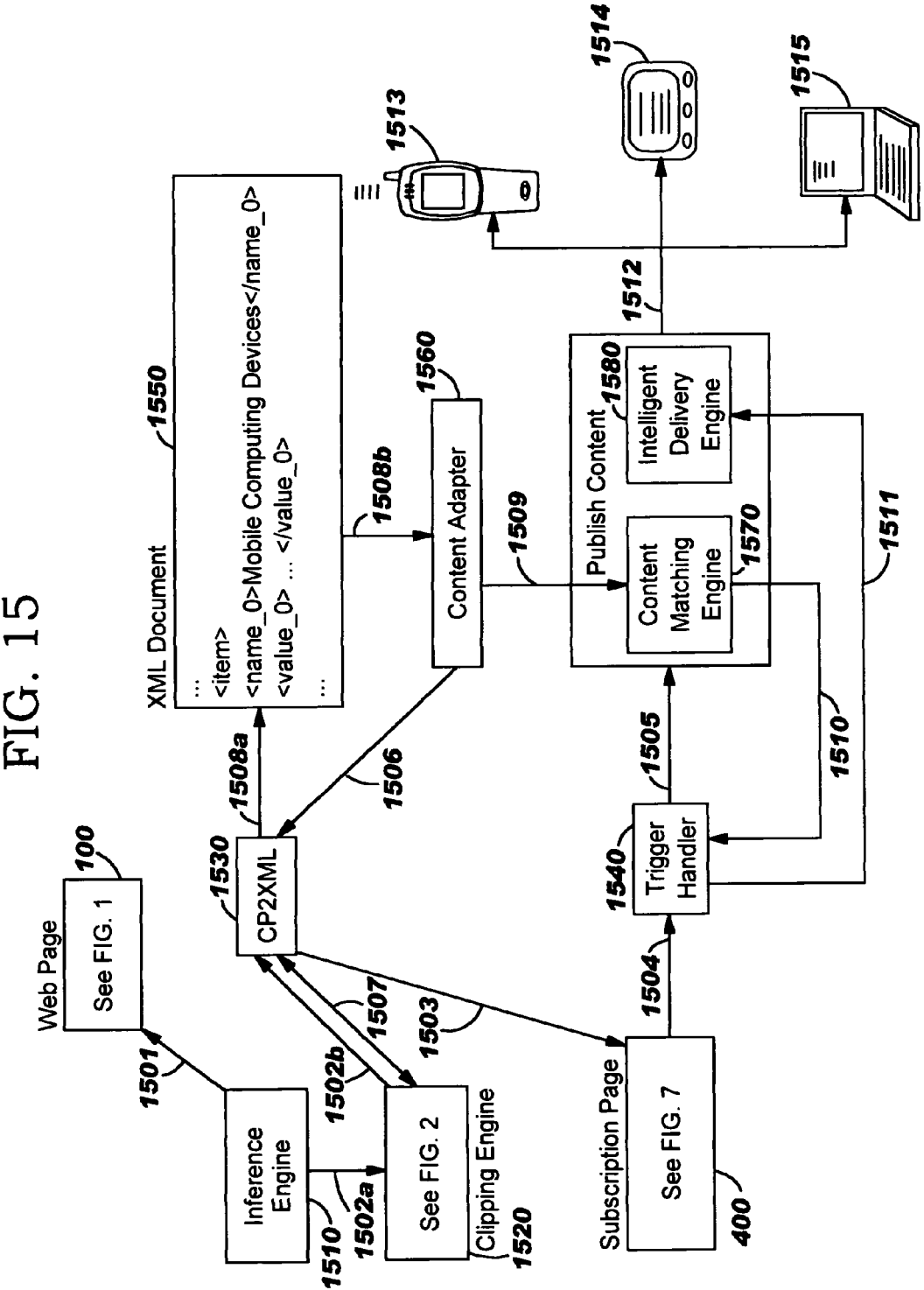
FIG. 15 shows components and flows used in preferred embodiments of the present invention.

Referring briefly to FIG. 15, which shows components and flows used in preferred embodiments of the present invention, an inference engine component 1510 is preferably leveraged for identifying user behavior patterns and then deducing, from those observations, what content the user might be interested in. One manner in which behaviors may be observed is to track Web pages viewed by users, as discussed above. This is illustrated in FIG. 15 at reference number 1501. Another way of identifying behavior patterns includes tracking signals from GPS-enabled vehicles, as has been described earlier. These examples are provided by way of illustration and not of limitation. The particular manner in which the behavior patterns are observed does not form part of the inventive concepts disclosed herein. Preferably, a commercially-available inference engine is leveraged by embodiments of the present invention. The inference engine may be augmented for also determining which content subscriptions to offer to candidate subscribers. Or, as another approach, the inference engine may provide its observations to the CP2XML component of the present invention, as discussed below, and this CP2XML may (for example) consult a mapping that associates selected behavior patterns with content subscriptions, thereby determining the subscriptions to be offered. As an example of this mapping, an online toy seller might provide a set of behavior patterns that it believes are common to potential customers, and this set of behavior patterns might then be associated with the toy seller's Web page. As yet another approach, a separate code component may be used with embodiments of the present invention for making this comparison, and the manner in which a code component of this type may be used with embodiments discussed herein will be readily understandable to those of ordinary skill in the art.

The inference engine may be directed to search for predetermined behavior patterns, where those patterns may be supplied by an enterprise wishing to locate users potentially interested in content subscriptions. Or, the inference engine may operate without this type of guidance, without deviating from the scope of the present invention.

Preferred embodiments also leverage a Web clipper component or "clipping engine" 1520, which clips (i.e., extracts) content according to subscriptions that are offered to, and accepted by, users. Web clippers are known in the art. As one example, WebSphere Portal Server Version 4.1, a commercially-available product of International Business Machines Corporation ("IBM") provides a Web clipper, referred to herein as the "WSPS Web clipper". The manner in which this WSPS Web clipper (or another Web clipper) may be used with embodiments of the present invention will now be described in more detail.

Preferably, the inference engine 1510 provides 1502a content from a particular URL, according to a user's observed behavior, to the clipping engine 1520. The clipping engine then clips out selected content, and preferably creates therefrom a markup language document which is then passed 1502b to a "CP2XML" component 1530.

(Note, however, that it is not strictly necessary that a Web clipper component be provided. Alternatives include writing code that extracts the pertinent content from a Web page, and manually creating a representation of content selection that adheres to formats used by an implementation of the present invention.)

When using the WSPS Web clipper, XPath syntax is generated when the inference engine identifies content to which a subscription will be offered. Preferred embodiments parse the underlying content of the Web page and the XPath is applied to indicate how this underlying content should be clipped, or extracted, if the user accepts this subscription. The source content is typically encoded in the Hypertext Markup Language ("HTML"), and thus the output file created by processing the XPath specification is preferably an HTML document. XPath notation is well known in the art, and a detailed description thereof is therefore not presented herein. For more information, reference may be made to the XPath specification, which is titled "XML Path Language (XPath)" and which is available from the World Wide Web Consortium.

FIG. 3 shows sample XPath statements 300 that might be used to clip content from a representative Web page, such as Web page 100. The "url" element 310 specifies the source file to which the annotation defined at 320 is to be applied for clipping content. The "description" elements 330, 340, 350 specify, in this example, that everything in the HTML page prior to the first child of the first BODY tag should be removed (element 330); that the descendent text which includes the string "Results:" within the first TABLE tag should be kept (element 340); and the elements following the closing of that kept element should be removed (element 350).

Referring again to FIG. 15, reference number 1502b indicates that the candidate subscription information is forwarded to a component referred to herein as CP2XML 1530, as stated above. The CP2XML component receives the forwarded serialized information, along with an indication of the source (e.g., the URL) from which the content was originally clipped. The CP2XML component then transcodes the serialized information. Preferably, the output of the transcoding operation is an Extensible Markup Language ("XML") document. (Note that if a clipping component is not used in a particular implementation of the present invention, the HTML content to be transcoded may be created using other means, including a simple text editor, and forwarded to the CP2XML component for transcoding. As another alternative, the XPath statements illustrated by the example in FIG. 3 may be written using other means, including a text editor or other tool, and the XPath statements can then be executed against the source file to generate the HTML content to be delivered to the CP2XML component.)

Figure 4:
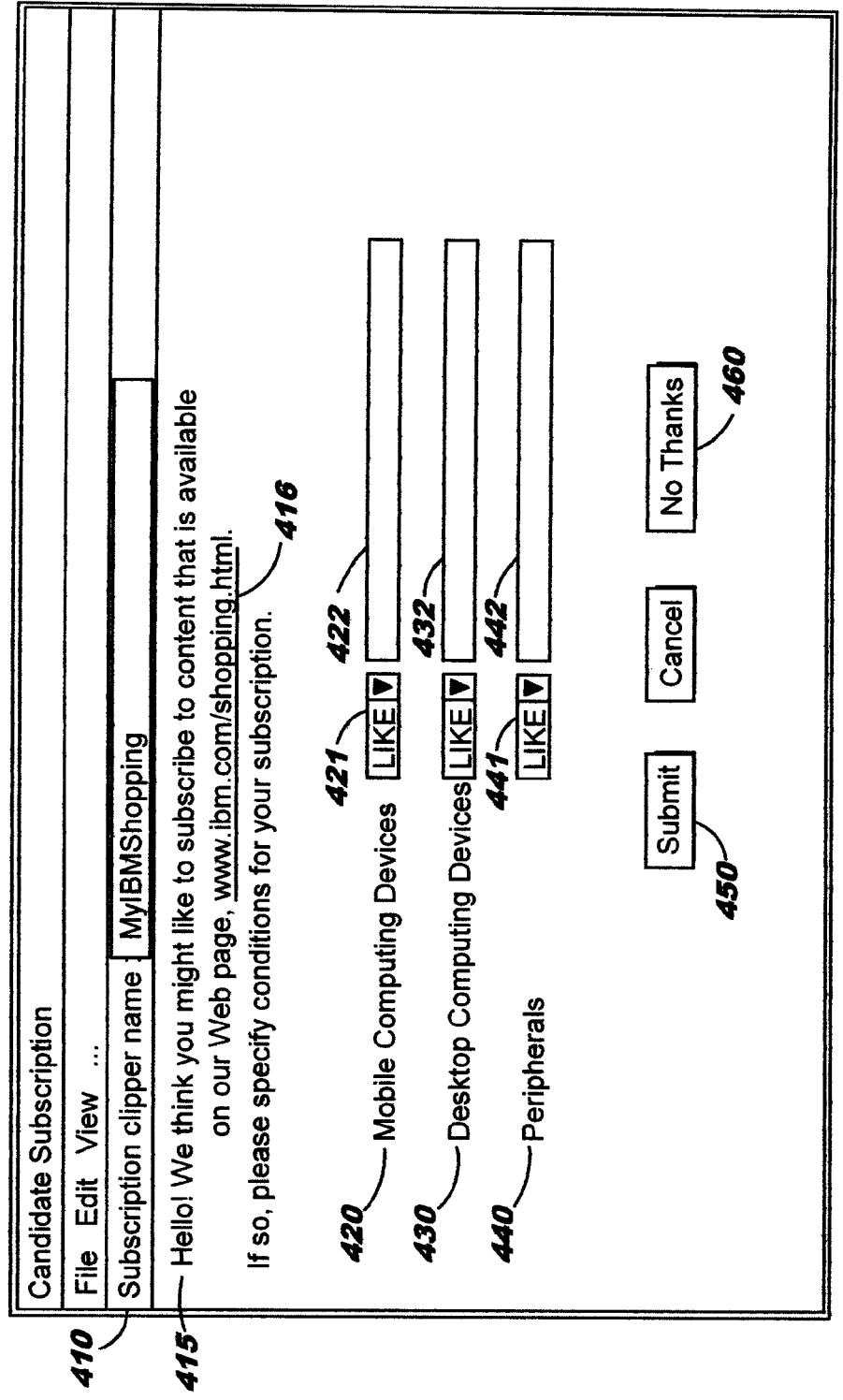
FIGS. 4 and 7 illustrate subscription menus of the type that may be provided by preferred embodiments to enable users to customize their subscription.

Operation of the CP2XML component will now be described in more detail with reference to FIGS. 4-8 and 15. FIG. 4 provides a sample subscription page 400 that may be offered to the candidate user for establishing a content subscription. See the welcome message at reference number 415, which includes a description of the candidate content (in this case, by specifying the content's URL at 416; alternatively, a description may be provided in another form, such as by using a graphical image or icon). In this example, the sample page 400 also enables the user to customize his/her subscription by specifying conditions that must occur before the user is interested in receiving a content update. In preferred embodiments, this page is built from the HTML input provided by the clipping engine at 1502a. Reference number 1503 of FIG. 15 represents the CP2XML component 1530 creating and rendering this candidate subscription page 400 to the user.

Figure 5:
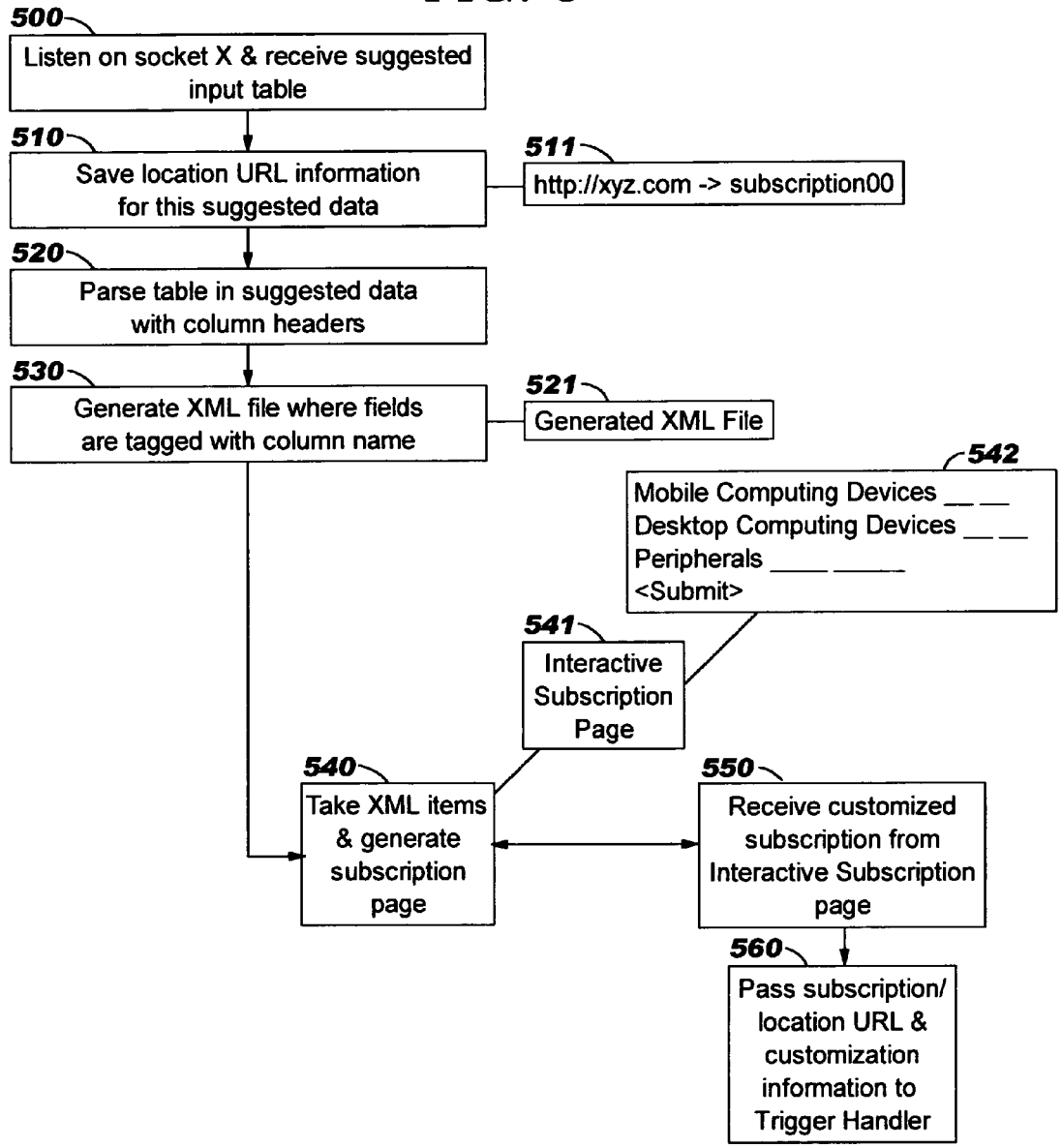

As indicated by the flowchart in FIG. 5, one aspect of the CP2XML component of preferred embodiments listens on a socket (referred to in FIG. 5 as "socket X", for illustrative purposes), where it receives the HTML input in tabular format (Block 500) specifying the suggested subscription. The location URL associated with this suggested data, which is also provided, is saved by the CP2XML component (Block 510). For example, as indicated at reference number 511, a location URL of "http://xyz.com" may be associated with candidate subscription information identified as "subscription00". The CP2XML component then parses the provided HTML table, extracting its column headings (Block 520), and generates an XML file (Block 530) containing that information. Preferably, the XML file uses the column names as tag values. This generated XML file is represented in FIG. 5 at reference number 521. See also the example XML file in FIG. 6, which may be created by the CP2XML component to correspond to the selective version of the candidate content, where this selective version is based on the portions with which this user interacts (as discussed above with reference to FIG. 2). The XML file created at Block 530 is then used to generate (Block 540) the candidate subscription page for presentation to the user, an example of which is depicted in FIG. 4. Note that the manner in which an address usable for contacting the candidate user is determined does not form part of the inventive concepts of the present invention. Techniques for mapping user information to a network-accessible address are well known in the art, and a mapping of this type may be consulted. (For example, if the observed user behavior is interaction with Web pages, then the user's log-in identifier may be available and can be used to access a mapping. As another example, if the observed behavior pertains to a GPS tracking device, a serial number or other identifier of that tracking device may be usable as an index into a mapping for contacting the device owner.) It should also be noted that the initial notification to the user does not necessarily require notification over a network connection, and other types of notifications are within the scope of the present invention. For example, a letter might be printed and mailed to the user, informing the user that he/she has been identified as a candidate subscriber, and providing a URL where the user can choose to view information about, and/or accept, the candidate subscription (and also customize that subscription, when supported by an implementation of the present invention).

Reference numbers 541 and 542 in FIG. 5 indicate that the user interacts with this subscription page. For example, if the user decides to accept the suggested subscription, then he/she may proceed to customize that subscription, and submit the customization when ready (as discussed below with reference to FIG. 4). The CP2XML component then receives the customization input (Block 550), and passes (Block 560) the URL of the source Web page and the customization information to a trigger handler component.

Turning again to FIG. 4, the manner in which a candidate subscription may be offered to users, and in which they may choose to customize the subscription according to preferred embodiments, will now be described in more detail. (In the example of FIG. 4, a "No Thanks" button 460 has been depicted, indicating that preferred embodiments preferably provide an easy-to-use mechanism for the user to decline a candidate subscription.) In this example, reference number 410 illustrates that a name is preferably associated with the subscription (and its customization). This name may be programmatically generated, or an implementation of the present invention may enable the user to select the name. The candidate subscription content determined by the inference engine is presented, in this example, using a category-style approach as shown at 420, 430, 440. Preferably, when using this approach, an implementation of the present invention then populates the drop-down lists 422, 432, 442 with the observed values (e.g., "Model 456", "Model ABC", and "Monitors", referring to the sample values in FIG. 2) and allows the user to accept or modify those populated values. In alternative embodiments, a multi-tiered display may be used, for example by presenting values for each observed category, along with check boxes or other graphical means with which the user can indicate whether those are the desired values to use as subscription conditions.

Examples hereinafter assume the user accepts the subscription offered in FIG. 4. The user may wish to limit his/her subscription to models of mobile computing devices, for example. In this case, the user preferably types one or more model names into text entry field 422. An appropriate delimiter, such as a comma or semicolon, is preferably used when multiple model names are supplied. Wild cards may be supported, if desired. In addition, preferred embodiments preferably use a drop-down list 421 that enables the user to easily specify a wider range of values. For example, the user might select the "LIKE" choice depicted in list 421 and then type select "Model 456" as the value of text entry field 422 to indicate that he/she wishes to see mobile computing devices having model names which are similar to Model 456. "Similar", in this context, may be interpreted as all model numbers containing the string "Model 456", such as a "Model 456 Enhanced" and a "Model 456 Express", for example. Or, an implementation of the present invention may be adapted for determining factors such as particular characteristics of the Model 456 (including processor speed, functionality, and so forth), and using mobile computing devices of similar characteristics for those model names which are "like" Model 456. An another example, an implementation may perform a string pattern-matching operation to determine whether one value is "like" another.

A database or other repository of terms, indexed by keywords such as "Model 456", may be used with an implementation of the present invention to enable making a programmatic determination of which values are similar to those selected by the user. For example, the database might use "Model 456" as a keyword to retrieve a set of comparison criteria that define how to determine whether one model of mobile computing device is similar to another. As another example, "Monitors" might be used as a keyword that will retrieve a set of criteria indicating how to tell if one computer monitor is similar to another. In this latter case, sets of monitor identifiers/descriptors that are to be considered as matching, such as "Monitor M1B2A" and "Monitor model number M1B2A", might be specified.

Preferred embodiments leverage a commercially-available component for performing the subsequent comparisons between patterns as customized by the user on display 400 and the content displayed in the actual Web page to which the user is accepting a candidate subscription. The component responsible for these comparisons is referred to herein as a "content matching engine", and is discussed in more detail below.

Drop-down list 421 may contain other entries such as "EQUAL", indicating that the user wants an exact match on values of the mobile computing device identifier, or "IN", indicating that the user has specified some string (such as a device series code) that must be found in the device identifier before a mobile computing device is of interest to this user. Preferably, when the value being customized is numeric rather than textual, other choices are provided. For example, symbols such as "=", "<", and ">" may be provided for use with numeric choices.

The approach shown in FIG. 4 enables the user to refine what type of information he/she wishes to see if a candidate subscription is accepted. Once the subscription information has been defined and processed, the source Web page will subsequently be queried (as discussed in more detail below) to determine whether any content matching the user's filter is currently rendered in that Web page. (The term "filter", as used herein, refers to customization parameters or conditions which are selected using a customization display such as that shown in FIG. 4.) Thus, in the mobile computing device example, the user might choose to be notified every time a new mobile computing device in the Model 456 series appears on shopping site 100. Once the user has provided values to be used in customizing this subscription, he/she preferably presses a "Submit" button 450 or otherwise indicates that the customization is ready for submission.

As will be obvious, a candidate subscription may offer many different kinds of content, and the conditions to be specified may vary widely. A user might be observed as frequently checking a company's stock price which is located somewhere on the company's home page, for example, and might then be asked if he/she is interested in subscribing to updates on this stock price. Or, the user might be allowed to specify an interest in receiving updates only when the stock price exceeds some configured amount or percentage of increase (where the amount or percentage is preferably selected by the user during customization).

The user may also be allowed to select one or more events (referred to equivalently herein as "actions") that should be invoked when the source Web page contains content matching the user's subscription filter, and the choices to be presented to the user may be determined in a number of ways without deviating from the scope of the present invention. A sample display 700 that may used for this purpose is provided in FIG. 7, as will now be described. (Note that the choices depicted in FIG. 7 are merely representative, and an implementation of the present invention may provide additional or different choices.)

As one example of an applicable event, the user may select to have content delivered to a particular device (which may be identified, for example, using a network address or device address). Or, the user might select to have some particular process executed when the filter locates matching content.

Figure 7:
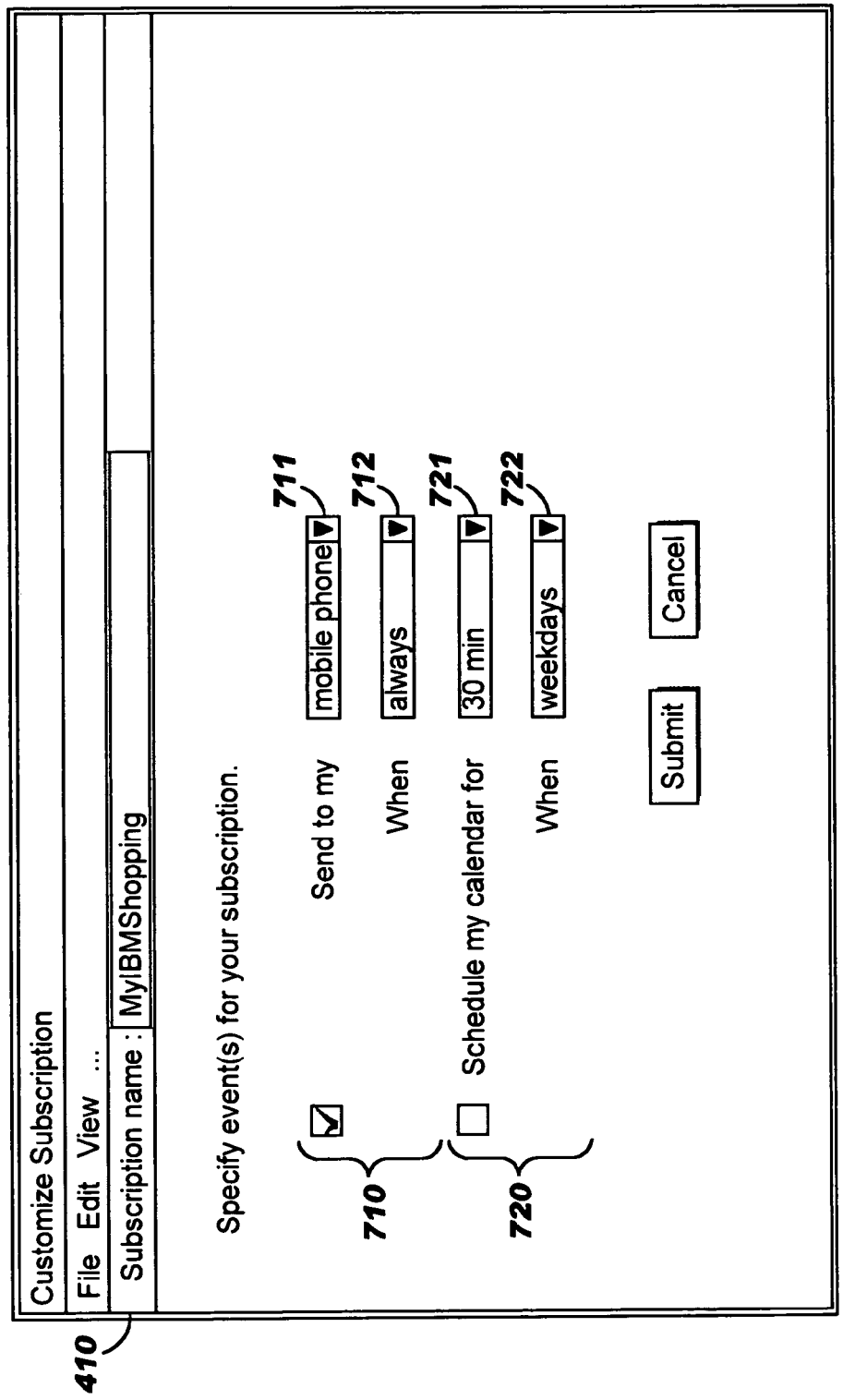

In the example of FIG. 7, the user is provided with a first selection 710 with which he/she can indicate that the matching content should be sent to a device. In one approach, a drop-down list 711 may be configured to provide a set of standard, predetermined selections for the target device. In another approach, the choices may be retrieved from an external source such as a configuration file or directory entry. As yet another approach, a database or other repository which uses keywords as an index may be queried to determine which action choices are applicable, given the terms (such as "mobile computing device", "desktop computing device", and "peripherals") being used in a particular customization. As still another approach, the CP2XML component may be adapted for consulting a user profile or similar source to provide choices which are specifically adapted to the user who is specifying this customization, and then presenting these choices in drop-down list 711. As will be obvious, in this latter approach, a user identifier is preferably obtained by the inference engine component and communicated to the CP2XML component. Or, the CP2XML component may provide an input means for obtaining the user identifier directly from the user, such as by adding another field to display 400. The user may optionally be authenticated, using authentication techniques which are outside the scope of the present invention.

An optional "when" parameter is also shown in FIG. 7, and preferably uses a drop-down list as shown at 712. This parameter may be set to (and may default to) "always", indicating that the user wants the "send to" action 710 to be carried out every time the subscription filter is matched.

Another use of the "when" parameter is shown, by way of illustration, in the second selection 720. This action can be selected if the user wants time scheduled on his/her electronic calendar when the subscription filter is matched. For example, the user might like to take some time to review details of a new mobile computing device offering that has been detected using his/her subscription filter. As shown in drop-down list 721, a time period such as 30 minutes might be selected for this "schedule calendar" action 720, and the user might further specify that this automated scheduling is only to happen on week days, as indicated in the "when" drop-down list 722.

A number of different approaches to determining the actions to be presented to a user were described above. In still another approach, embodiments of the present invention may be adapted for providing one or more actions without user input. For example, a default action might be taken when a user's subscription filter matches, without deviating from the inventive concepts disclosed herein. One example of such a default action is to always send the matching content to a user's computer, and a user-to-device mapping might be consulted to determine how to connect to a particular user's computer for content delivery. (Preferred embodiments leverage a commercially-available mechanism for the actual delivery of the content, as discussed in more detail below.)

As stated previously with reference to Block 560 of FIG. 5, the customization information is sent by the CP2XML component to a trigger handler component. This passing of information is also depicted at reference number 1504 of FIG. 15, and the trigger handler is shown at reference number 1540. In preferred embodiments, the information passed to the trigger handler by the CP2XML component is encoded as an XML document. A sample document for the online shopping scenario, corresponding to the customizations illustrated in FIGS. 4 and 7, is presented in FIG. 8.

The trigger handler 1540 of preferred embodiments transforms the XML document received from the CP2XML component into a trigger that a content matching engine understands. Preferably, a commercially-available content matching engine which operates in a publish/subscribe mode is leveraged, and the transformation performed by the trigger handler component comprises adapting the XML document to the application programming interface ("API") used by that content matching engine. The content matching engine is depicted in FIG. 15 at reference number 1570, and the passing of the adapted XML document from the trigger handler to the content matching engine is shown at 1505. (The format of the XML document passed to the content matching engine will vary, depending on the API of the particular content matching engine which is deployed with an implementation of the present invention, and this document has therefore not been illustrated.)

Figure 9:
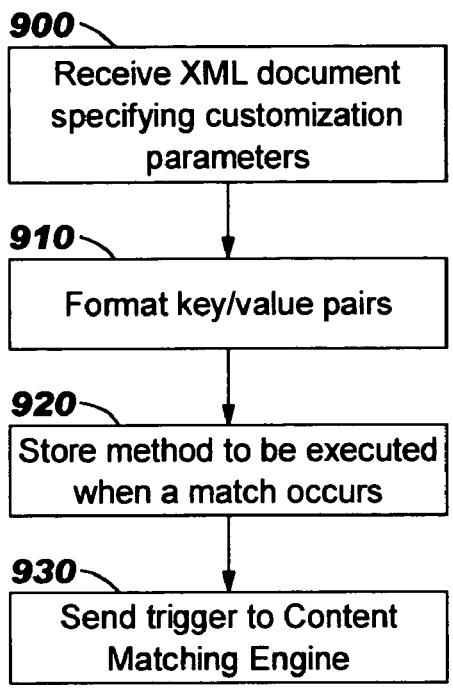
FIGS. 9 and 13 provide flowcharts depicting logic that may be used when implementing aspects of a trigger handler component used in preferred embodiments.

The flowchart in FIG. 9 depicts logic which may be used when implementing this transformation aspect of the trigger handler. As shown therein at Block 900, the trigger handler receives the XML document specifying customization information (e.g., XML document 800 of FIG. 8) from the CP2XML component. The information is then formatted (Block 910), preferably into key-value pairs (or another format, as appropriate to the content matching engine's API), specifying conditions that are to be considered as a match when the content matching engine evaluates content. (This set of formatted conditions may alternatively be referred to as a "trigger".) Block 920 indicates that the trigger handler stores information about which method(s) should be executed when a particular match occurs. For example, with reference to the sample customization depicted in FIGS. 4 and 7, a method that sends content to a mobile device and (if selected by the user) a method that schedules events on electronic calendars would be recorded by Block 920 when processing this customization. The formatted information is then sent (Block 930) to the content matching engine.

Upon receiving information from the trigger handler, the content matching engine 1570 registers that information (using techniques which are outside the scope of the present invention) for use when subsequently evaluating Web page content.

At this point, a subscription has been dynamically created and registered. A description of how this subscription is used to deliver content to the user (and/or to perform other actions desired by the user) will now be provided, referring to FIGS. 10-15.

Preferred embodiments use a content adapter component, shown at reference number 1560 of FIG. 15, to periodically initiate a content evaluation operation. A timer-driven approach may be used, whereby the content adapter initiates the evaluation at some predetermined or configurable interval(s). Or, an event-driven approach may be used. Discussions hereinafter are in terms of using a timer-driven approach, by way of illustration.

The content adapter of preferred embodiments initiates a content evaluation by querying the CP2XML component, as shown at reference number 1506 of FIG. 15, which in turn causes a second aspect of the CP2XML component to retrieve data from the source Web page, as shown at reference number 1507. The flowchart in FIG. 10 depicts logic that may be used when implementing the content adapter functionality, as will now be described.

When the periodic interval is triggered, the content adapter sends a request to the CP2XML component (Block 1000). The flowchart in FIG. 11 depicts logic that may be used for this second (i.e., content retrieval) aspect of the CP2XML component. As indicated at Block 1100 of FIG. 11, the CP2XML component preferably listens on a socket (referred to in FIG. 11 as "socket Y", for illustrative purposes) for incoming requests from the content adapter, and in preferred embodiments, each request specifies the URL of the content to be evaluated. (In alternative embodiments, the CP2XML component may use information it saved at Block 510 of FIG. 5, illustrated by association 511, to determine the URL of interest. In this approach, the content adapter preferably passes the subscription identifier, such as "subscription00" or "MyIBMShopping", rather than the URL.) The CP2XML component then requests that the Web clipping engine clip content from a current version of the Web page associated with that URL, and this clipped content is preferably returned to the CP2XML component as a table formatted in HTML (Block 1110). Preferably, the same XPath code used when sending the subscription information to the CP2XML component at reference number 1502 is used for creating this HTML table. Upon receiving the table data (Block 1120) from the Web clipping component, this aspect of the CP2XML component transcodes and re-formats the items, preferably by column header (Block 1130), to create a markup language document (which is preferably encoded in XML). See, for example, reference number 1550 of FIG. 15, which depicts a sample XML document that includes at least one "item" element having "name" sub-elements for each column header and "value" sub-elements for each of those columns.

A sample XML document 1200, created at Block 1130 after the CP2XML engine has received results of a fresh query to the Web page illustrated in FIG. 1, is depicted in FIG. 12. As shown therein, a number of new product offerings meeting the user's interest have been created (referring to the previous Web page content shown in FIG. 1). This new XML document is then returned to the content adapter (Block 1140). This passing of the revised content in an XML document is illustrated in FIG. 15 at reference numbers 1508a, 1508b.

Figure 10:
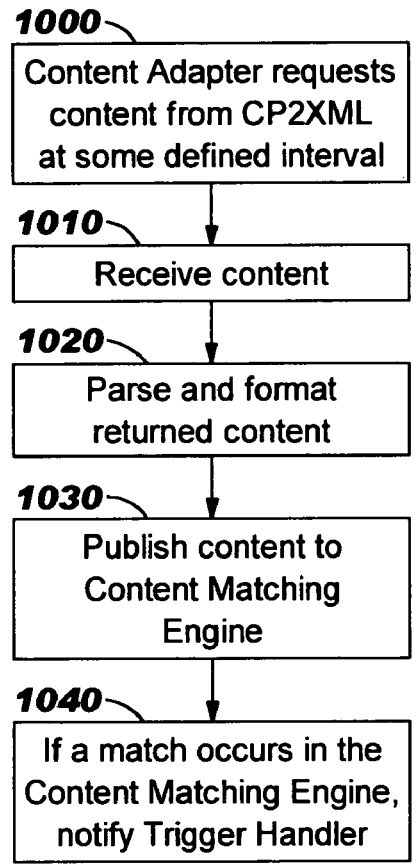
FIG. 10 provides a flowchart depicting logic that may be used when implementing a content adapter component used in preferred embodiments.

Returning now to the discussion of content adapter functionality in FIG. 10, when the content adapter receives content from the CP2XML component (Block 1010), it parses and formats that returned content (Block 1020) for delivery to the content matching engine. Preferably, this comprises formatting the returned XML document (as illustrated by example document 1200 in FIG. 12) into a form suitable for the content matching engine. This content is then published (i.e., submitted) to the content matching engine (Block 1030), as shown at reference number 1509 of FIG. 15, where it will be evaluated using triggers sent from the trigger handler component (as described above with reference to 1505 of FIG. 15). This comparison of content to triggers (i.e., conditions) preferably uses prior art techniques which are outside the scope of the present invention, as stated earlier.

Figure 13:
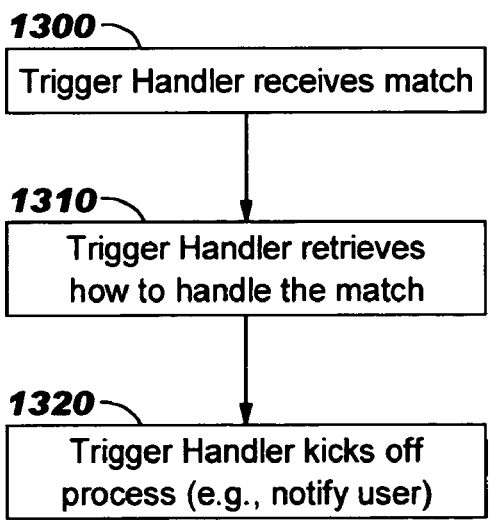

If a match is detected by the content matching engine, then Block 1040 notifies a second aspect of the trigger handler. The notification preferably comprises sending a message to this aspect of the trigger handler, indicating which trigger has matched. The notification is also shown by reference number 1510 of FIG. 15, and FIG. 13 provides a flowchart depicting logic with which the second aspect of the trigger handler may be implemented. As shown therein, when this aspect of the trigger handler is notified of a match (Block 1300), it retrieves previously-stored information (Block 1310) about how to handle this match. For example, one or more method names are preferably stored for each potential match, as has been described above with reference to Block 920 of FIG. 9. Upon locating this stored information, Block 1320 kicks off the associated process or method. For example, with reference to the customization shown in FIGS. 4 and 7, the content received by the content adapter at Block 1010 is delivered to the user's mobile phone if it matches the Mobile Computing Device, Desktop Computing Device, and/or Peripherals, parameters, as selected by this user (according to the user's selection at reference number 711 of FIG. 7). In the general case, one or more actions may be taken by the trigger handler at Block 1320, depending on the actions defined in the subscription for which the trigger matches the updated content published at 1509.

Preferably, the trigger handler requests an intelligent delivery engine 1580 to carry out delivery to devices, when delivery of content is indicated as an action. This request is shown at reference number 1511 in FIG. 15, and the intelligent delivery engine is preferably a commercially-available component whose functionality is beyond the scope of the present invention. As shown in the sample configuration in FIG. 15, the intelligent delivery engine may be adapted for routing messages 1512 to devices including mobile phones 1513, pagers 1514, and/or portable computing devices 1515. The intelligent delivery engine functionality may be provided, for example, by the Intelligent Notification Service, or "INS", product of IBM. (Note that, in contrast to the present invention, users of the existing INS product must explicitly request a subscription. Furthermore, the existing INS product allows users to subscribe only to content having a deployed subscription interface for content updates. The subscription interface is sometimes referred to in the prior art as a "notification service", "notification application", or "subscriber delivery channel".)

Figure 14:
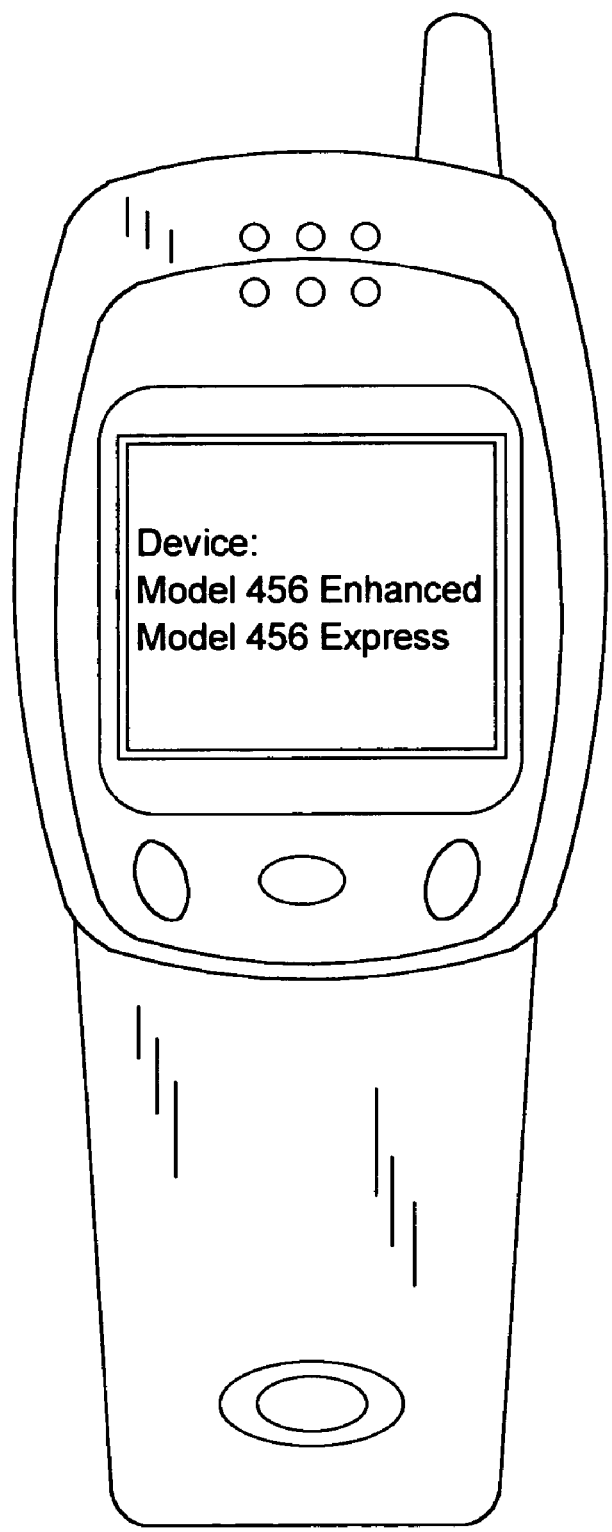
FIG. 14 depicts an example client application executing on a client device, showing how information may be delivered according to a user-customizable subscription.

FIG. 14 illustrates delivery of a sample message, via the intelligent delivery engine, to a user's mobile phone. As shown therein, this message notifies the user that a product offering is available meeting certain criteria, in accordance with the user's dynamically-created subscription filter. Note that the sample message displayed in FIG. 14 illustrates an optional enhancement that may be used with preferred embodiments, whereby information is translated or transcoded for delivery to particular devices. For example, "Mobile Computing Device" has been shortened to "Device" and the device information clipped from the Web page has been formatted into two separate lines of text, in view of the message destination being a mobile device with constraints upon display size.

Returning now to the content adapter and trigger handler, these components are preferably deployed as paired, customized components. For example, one content adapter may be customized for processing information about offerings on computing products (e.g., receiving this information and delivering it to the content matching engine), while another content adapter may be customized for processing information about stock prices. A trigger is defined by type (e.g., stock, weather, news, etc.) and when the content matching engine determines a match, it passes the type to the trigger handler. The trigger handler then knows how to handle the match, according to the type.

As has been described, embodiments of the present invention provide a number of advantages to end users and to companies. An implementation of the present invention may be offered as a stand-alone product or as a service, or it may be coupled or integrated with another software product such as IBM's WebSphere® Everyplace® Access or IBM's INS product. ("WebSphere" and "Everyplace" are registered trademarks of International Business Machines Corporation in the United States, other countries, or both.)

As will be appreciated by one of skill in the art, embodiments of the present invention may be provided as methods, systems, or computer program products. Accordingly, the present invention may take the form of an entirely hardware embodiment, an entirely software embodiment, or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein. The computer-usable storage media excludes a signal. In addition, the present invention may be offered as a method of doing business (for example, whereby user behaviors are monitored and used to make recommendations for candidate subscriptions, process those subscriptions, and so forth).

The present invention has been described with reference to flow diagrams and/or block diagrams of methods, apparatus (systems), and computer program products according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention.

What is claimed is:

1. A computer-implemented method of enabling users to subscribe to content in a computing environment without initiating a subscription process, comprising:
   identifying a content access behavior pattern of a user;
   responsive to the identifying, consulting a mapping that associates content access behavior patterns of users with corresponding candidate content subscriptions to be offered to users exhibiting the associated content access behavior patterns, thereby determining a selected one of the candidate content subscriptions which corresponds to the identified content access behavior pattern of the user, the selected one indicating a subset of content generated by a content source;
   offering, to the user on a graphical user interface device, a subscription to the subset of the content by rendering a subscription interface for the subset, the subscription interface comprising a Web page which is distinct from a Web page usable for rendering the content generated by the content source;
   responsive to acceptance of the offered subscription by the user, storing a trigger document associated with the user and the content, the trigger document specifying at least one condition associated with the subset; and
   subsequently evaluating a then-current version of the content generated by the content source, using the at least one condition specified in the trigger document, to determine whether a then-current version of the subset of the then-current version of the content is considered a match to the at least one condition, and if so, automatically sending the then-current version of the subset to the user as subscribed-to content of the subscription and also scheduling an interval of time on an electronic calendar of the user, wherein the interval of time is specified in the trigger document along with an indication of when the interval of time can be scheduled on the electronic calendar.

2. The computer-implemented method according to claim 1, wherein the subsequently evaluating is invoked responsive to expiration of a timer which is distinct from the electronic calendar of the user.

3. The computer-implemented method according to claim 1, wherein the subsequently evaluating is invoked responsive to occurrence of an event.

4. The computer-implemented method according to claim 1, wherein the identifying is performed by an inference engine.

5. The computer-implemented method according to claim 1, wherein the identifying comprises identifying how the user interacts with a rendering of the content which is generated by the content source.

6. The computer-implemented method according to claim 1, wherein each of the at least one condition specified in the trigger document comprises a data name and a data value.

7. The computer-implemented method according to claim 6, wherein each of the at least one condition specified in the trigger document further comprises a comparison operator.

8. The computer-implemented method according to claim 1, wherein the trigger document further specifies at least one process to be invoked when the subsequently evaluating determines that the then-current version of the subset is considered a match to the at least one condition.

9. The computer-implemented method according to claim 1, wherein a user-defined amount of time is used for the interval of time.

10. A system for enabling users to subscribe to content in a computing environment without initiating a subscription process, comprising:
    a computer comprising a processor; and instructions which are executable, using the processor, to performs functions comprising:
    identifying a content access behavior pattern of a user;
    responsive to the identifying, consulting a mapping that associates content access behavior patterns of users with corresponding candidate content subscriptions to be offered to users exhibiting the associated content access behavior patterns, thereby determining a selected one of the candidate content subscriptions which corresponds to the identified content access behavior pattern of the user, the selected one indicating a subset of content generated by a content source;
    offering, to the user, a subscription to the subset of the content by rendering a subscription interface for the subset, the subscription interface comprising a Web page which is distinct from a Web page usable for rendering the content generated by the content source;
    responsive to acceptance of the offered subscription by the user, storing a trigger document associated with the user and the content, the trigger document specifying at least one condition associated with the subset; and
    subsequently evaluating a then-current version of the content generated by the content source, using the at least one condition specified in the trigger document, to determine whether a then-current version of the subset of the then-current version of the content is considered a match to the at least one condition, and if so, automatically sending the then-current version of the subset to the user as subscribed-to content of the subscription and also scheduling an interval of time on an electronic calendar of the user, wherein the interval of time is specified in the trigger document along with an indication of when the interval of time can be scheduled on the electronic calendar.

11. The system according to claim 10, wherein the subsequently evaluating is invoked responsive to expiration of a timer which is distinct from the electronic calendar of the user.

12. The system according to claim 10, wherein a user-defined amount of time is used for the interval of time.

13. A computer program product for enabling users to subscribe to content in a computing environment without initiating a subscription process, the computer program product comprising at least one computer usable hardware storage medium having computer usable program code embodied therein, the computer usable program code operable for:
    identifying a content access behavior pattern of a user;
    responsive to the identifying, consulting a mapping that associates content access behavior patterns of users with corresponding candidate content subscriptions to be offered to users exhibiting the associated content access behavior patterns, thereby determining a selected one of the candidate content subscriptions which corresponds to the identified content access behavior pattern of the user, the selected one indicating a subset of content generated by a content source;
    offering, to the user, a subscription to the subset of the content by rendering a subscription interface for the subset, the subscription interface comprising a Web page which is distinct from a Web page usable for rendering the content generated by the content source;
    responsive to acceptance of the offered subscription by the user, storing a trigger document associated with the user and the content, the trigger document specifying at least one condition associated with the subset; and
    subsequently evaluating a then-current version of the content generated by the content source, using the at least one condition specified in the trigger document, to determine whether a then-current version of the subset of the then-current version of the content is considered a match to the at least one condition, and if so, automatically sending the then-current version of the subset to the user as subscribed-to content of the subscription and also scheduling an interval of time on an electronic calendar of the user, wherein the interval of time is specified in the trigger document along with an indication of when the interval of time can be scheduled on the electronic calendar.

14. The computer program product according to claim 13, wherein the subsequently evaluating is invoked responsive to expiration of a timer which is distinct from the electronic calendar of the user.

* * * * *